United States Patent [19]

Yamaguchi et al.

[11] Patent Number: 4,803,677

[45] Date of Patent: Feb. 7, 1989

[54] ROTARY RECORDING MEDIUM HAVING A GUIDE TRACK AND RECORDING AND REPRODUCING APPARATUS THEREFOR

[75] Inventors: Hirohisa Yamaguchi; Horoshi Usami, both of Tokyo; Tadao Nagai, Sagamiko; Akira Mashimo, Tokorozawa, all of Japan

[73] Assignee: TEAC Corporation, Tokyo, Japan

[21] Appl. No.: 873,407

[22] Filed: Jun. 12, 1986

[30] Foreign Application Priority Data

Jun. 28, 1985 [JP] Japan ................... 60-141695
Jun. 28, 1985 [JP] Japan ................... 60-141696

[51] Int. Cl.$^4$ ................ G11B 7/007; G11B 7/095
[52] U.S. Cl. ..................... 369/44; 369/275; 369/111; 369/279; 358/342; 250/202
[58] Field of Search ............ 369/44, 275, 111, 277, 369/278, 279; 360/34.1; 358/342; 250/201, 202, 204

[56] References Cited

U.S. PATENT DOCUMENTS

| 4,223,349 | 9/1980 | Dakin | 358/342 |
| 4,472,748 | 9/1984 | Kato | 369/111 |
| 4,486,791 | 12/1984 | Wada | 369/44 |

FOREIGN PATENT DOCUMENTS

| 0097774 | 1/1984 | European Pat. Off. |
| 2608715 | 9/1977 | Fed. Rep. of Germany . |
| 2805322 | 8/1978 | Fed. Rep. of Germany . |
| 58-41446 | 3/1983 | Japan . |
| 217538 | 10/1985 | Japan . |
| 1465742 | 3/1977 | United Kingdom . |
| 2055237 | 2/1981 | United Kingdom . |

Primary Examiner—Alan Faber
Attorney, Agent, or Firm—Ladas & Parry

[57] ABSTRACT

A disc comprises a recording surface which is divided into a plurality of equiangular sectoral regions and a guide track formed on the recording surface. Each track turn of the guide track is constituted by a row of pits formed in every other equiangular sectoral regions, and the pit is only formed in one of two mutually adjacent track turns of the guide track in each equiangular sectoral region so that the pits are formed in every other track turns in a radial direction of the disc in each equiangular sectoral region. An apparatus for playing the disc comprises a circuit for producing a switching pulse signal having a period dependent on a period of the pits of the guide track based on signals which are reproduced from the two mutually adjacent track turns by sub light beams, a circuit for alternately inverting a polarity of signals which are reproduced from the two mutually adjacent track turns by a main light beam for every one half period of the switching pulse signal and for generating a tracking error signal, a tracking device, and a device for recording and reproducing an information signal on and from an intermediate part of the disc between the two mutually adjacent track turns.

8 Claims, 7 Drawing Sheets

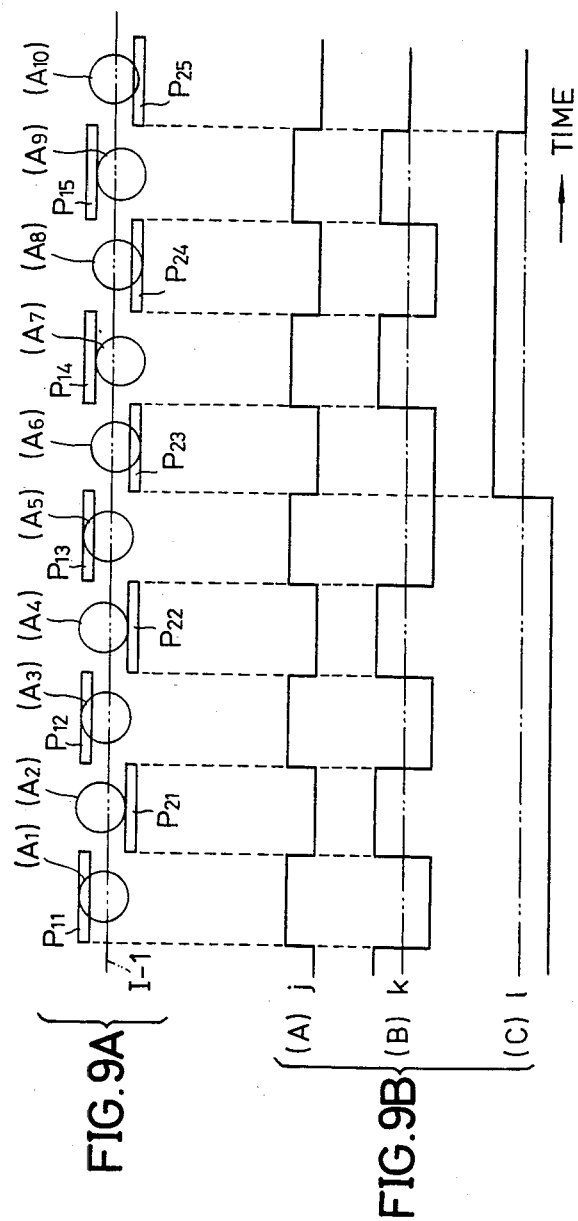

ROTARY RECORDING MEDIUM HAVING A GUIDE TRACK AND RECORDING AND REPRODUCING APPARATUS THEREFOR

BACKGROUND OF THE INVENTION

The present invention generally relates to rotary recording mediums having a guide track and recording and reproducing apparatuses therefor, and more particularly to a rotary recording medium having a guide track which is used for guiding a light beam when recording and reproducing an information signal by the light beam, and a recording and reproducing apparatus for recording and reproducing the information signal on and from the rotary recording medium by accurately controlling the tracking of the light beam.

When recording an information signal on a rotary recording medium (hereinafter simply referred to as a disc) by a light beam, it is known from a Japanese laid-open patent application No. 49-113601, for example, to first form a guide track on an unrecorded disc and then record the information signal on the disc by guiding the light beam by use of the guide track. The guide track may be constituted by a pair of continuous spiral tracks having a predetermined depth and located on both sides of a main track on and from which the information is recorded and reproduced. On the other hand, the guide track may be constituted by a single continuous spiral track having a predetermined depth.

When recording or reproducing the information signal on or from the disc which is formed with the pair of continuous spiral guide tracks, a pair of sub light beams for tracking are used in addition to a main light beam for recording or reproducing the information signal. The sub light beams are irradiated on the disc at positions which respectively lead and trail a position irradiated by the main light beam in the scanning direction and are mutually deviated in the width direction of the main track. A tracking control is performed so that one of the sub light beams is irradiated on a portion of one of the guide tracks and the other of the sub light beams is irradiated on a portion of the other of the guide tracks. Accordingly, the tracking of the main light beam is controlled to accurately scan the main track so as to record or reproduce the information signal on or from the main track.

On the other hand, in the case of the disc which is formed with a continuous spiral groove having a depth λ/8 as the single continuous spiral guide track, a single light beam is used to record and reproduce the information signal on and from the guide track, where λ denotes the wavelength of the light beam. At the time of the recording, the light beam scans the guide track to form pits of the information signal within the guide track, and the tracking of the light beam is controlled by use of first (−1-st and +1-st) diffracted lights which are generated when the light beam scans the guide track having the depth λ/8. In other words, when the light beam is irradiated on the guide track at a center position thereof, the light intensities of the first diffracted lights on right and left sides of the center position are equal to each other. However, when the light beam is irradiated at a position deviated from the center position of the guide track, a difference is introduced between the light intensities of the first diffracted lights. Hence, the tracking control is performed by detecting the difference between the first diffracted lights.

However, in the case of the conventional disc which is formed with the pair of continuous spiral guide tracks, conditions of the leading and trailing sub light beams differ when recording the information signal by use of the main light beam. That is, the trailing sub light beam is affected by the pits of the information signal recorded by the main light beam. For this reason, there is a problem in that it is impossible to obtain a correct tracking error signal.

On the other hand, in the case of the conventional disc which is formed with the single continuous spiral guide track, the first diffracted lights may or may not be generated when the light beam traverses the guide track at the time of the reproduction, depending on whether the light beam is irradiated on the groove portion or the non-groove portion of the disc. In some cases, reflected lights irradiated on a four-element photodetector which is divided into four optical sensors may become asymmetrical even when the light beam is correctly focused on the disc, and a focal servo operation may be performed erroneously. The reflected lights from the disc are irradiated on the four-element photodetector via a cylindrical lens. A light receiving surface (that is, the irradiated pattern) on the four-element photodetector becomes a perfect circular pattern when the focal point of the light beam is correctly on the disc (that is, in focus), and the irradiated pattern becomes an oval pattern when the focal point of the light beam is above or below the disc (that is, out of focus). Hence, there is a known astigmatic focusing method in which a subtraction is performed between a sum of outputs of a first pair of diagonally arranged optical sensors and a sum of outputs of a second pair of diagonally arranged optical sensors so as to obtain an error signal, and the error signal is supplied to a focal system so as to correct the focal error.

According to a recording and reproducing apparatus which employs the astigmatic focusing method to detect the focal error, the irradiated pattern on the four-element photodetector becomes asymmetrical and the sum of the outputs of one pair of diagonally arranged optical sensors becomes greater than the sum of the other pair of diagonally arranged optical sensors as the light beam traverses the guide track of the disc, even when the light beam is correctly focused on the disc. Hence, it is inappropriate to employ the astigmatic focusing method of detecting the focal error in the recording and reproducing apparatus for playing the disc which is formed with the single guide track. For this reason, in the recording and reproducing apparatus for playing the disc which is formed with the single guide track, it is desirable to employ a knife edge method of obtaining the focal error signal by placing a knife edge at a point where the reflected light beam becomes narrowest in the focused state and by detecting the reflected beam in a two-element photodetector which comprises two optical sensors. However, according to the knife edge method, there is a problem in that the optical system becomes complex because of the high accuracy required for the knife edge, two-element photodetector, lens, focal distance and the like.

SUMMARY OF THE INVENTION

Accordingly, it is a general object of the present invention to provide a novel and useful disc having a guide track and a recording and reproducing apparatus for playing the disc, in which the problems described heretofore are eliminated.

Another and more specific object of the present invention is to provide a disc comprising a recording surface which is divided into a plurality of equiangular sectoral regions and a guide track formed on the recording surface, where each track turn of the guide track is constituted by a row of pits formed in every other equiangular sectoral regions, and the pit is only formed in one of two mutually adjacent track turns of the guide track in each equiangular sectoral region so that the pits are formed in every other track turns in a radial direction of the disc in each equiangular sectoral region. A track turn of an information signal recording track can be formed in a region between the two mutually adjacent track turns of the guide track. According to the disc of the present invention, it is possible to obtain a tracking error signal from signals reproduced from the guide track by a main light beam. Hence, although the conventional disc having two continuous spiral guide tracks (grooves) located on both sides of an information signal recording track suffers a problem in that a trailing sub light beam is affected by the pits of the information signal recorded by a main light beam, it is possible to eliminate such a problem according to the present invention.

Still another object of the present invention is to provide a disc in which the guide track has a depth of $\frac{1}{2}$ the wavelength of the main light beam for recording and reproducing the information signal. According to the disc of the present invention, it is possible to prevent diffraction in a reflected light from the guide track. For this reason, a tracking error signal will not be affected by diffracted light even when the main light beam traverses the guide track. As a result, the astigmatic focusing method can be used as a method of detecting a focal error, and the construction of an optical system in a recording and reproducing apparatus can be simplified compared to that of the conventional recording and reproducing apparatus which is designed to play the conventional disc having a single continuous spiral guide track.

A further object of the present invention is to provide a recording and reproducing apparatus for playing a disc which comprises a recording surface and a guide track formed on the recording surface so that pits constituting the guide track are intermittently formed in a radial direction of the disc in each of a plurality of equiangular sectoral regions on the recording surface, where the apparatus produces a switching pulse signal based on reproduced signals which are obtained by scanning the guide track by sub light beams, produces a tracking error signal by switching signals reproduced from two mutually adjacent track turns of the guide track by a main light beam responsive to the switching pulse signal, and controls a scanning position of the main light beam responsive to the tracking error signal so that the main light beam scans a center position between the two mutually adjacent track turns of the guide track to record or reproduce an information signal. According to the recording and reproducing apparatus of the present invention, it is possible to perform a more accurate tracking control compared to the conventional recording and reproducing apparatus which is designed to play the conventional disc having two continuous spiral guide tracks (grooves) located on both sides of an information signal recording track, because the sub light beams are used to form a signal dependent on a period of the intermittent pits in the guide track and the tracking error signal is obtained based on the signals reproduced from the guide track by the main light beam. In other words, although the conventional disc having the two continuous spiral guide tracks located on both sides of the information signal recording track suffers a problem in that the trailing sub light beam is affected by the pits of the information signal recorded by the main light beam, such a problem will not occur according to the present invention.

Other objects and further features of the present invention will be apparent from the following detailed description when read in conjunction with the accompanying drawings.

BRIEF DESCRIPTION OF THE DRAWINGS

FIG. 9A shows examples of relative positional relationships of a main light beam and the track formed on the disc according to the present invention; and FIGS. 9B(A) through 9B(C) show signal waveforms for explaining the operation of an essential part of the block system shown in FIG. 6.

DETAILED DESCRIPTION

Figure 1:
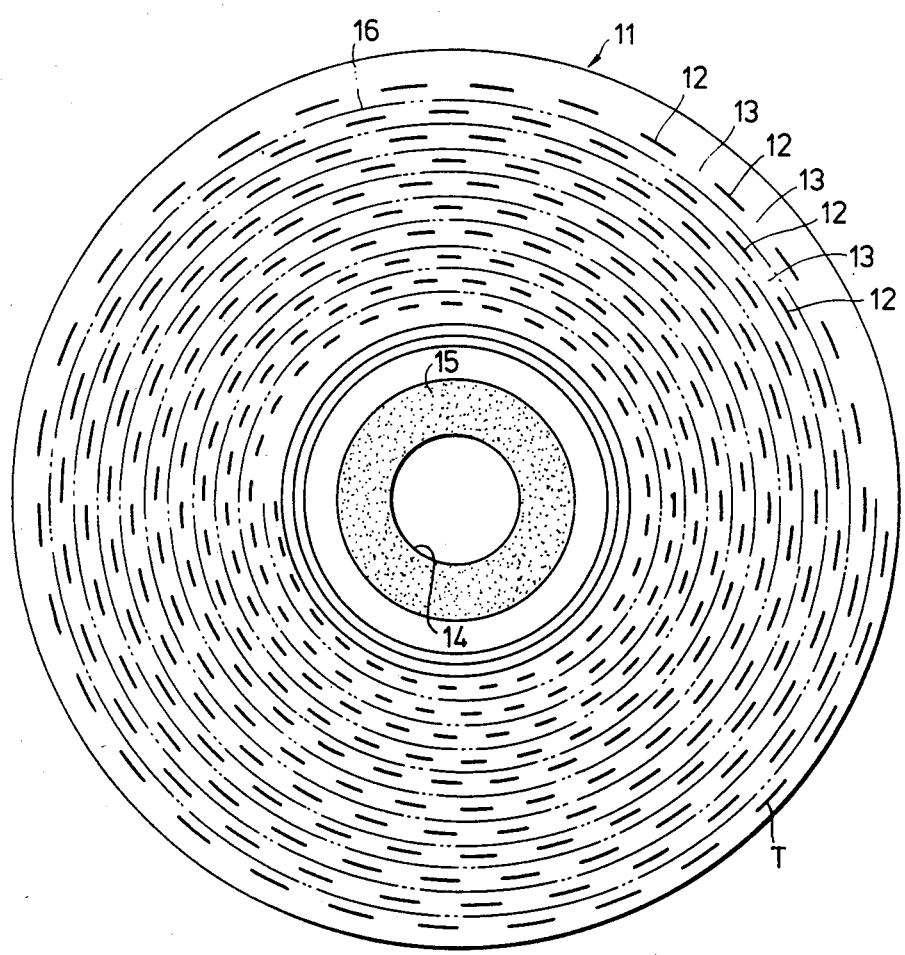
FIG. 1 shows a track pattern formed on a first embodiment of the disc according to the present invention.

FIG. 1 shows a track pattern formed on a first embodiment of the disc according to the present invention. In FIG. 1, a rotary recording medium (disc) 11 has a diameter of 30 cm, for example, and a spiral guide track T is formed with a constant track pitch (for example, 1.6 microns) when the disc 11 is produced. The guide track T is made up of a plurality of consecutive guide track turns, and each guide track turn is constituted by an intermittent row of pits. In other words, a pre-formed pit 12 and a non-pit portion 13 are alternately formed repeatedly in each guide track turn. The pre-formed pits 12 are initially formed on the disc 11 before an information signal is first recorded thereon. That is, the pre-formed pits 12 are pre-formed on the disc 11 before the actual recording of the information signal. In the present specification, these pre-formed pits 12 will simply be referred to as pits 12.

The length of each pit 12 of the guide track T is selected to a value which is equal to a recording length of one horizontal scanning period (1 H) of a video signal recorded on a constant angular velocity (CAV) system disc, for example. In addition, when a recording surface of the disc 11 is divided into a plurality of imaginary equiangular sectoral regions, the pit 12 is formed in only one of two consecutive guide track turns of the guide track T in each equiangular sectoral region so that the pits 12 are formed in every other guide track turns in a radial direction of the disc 11 in each equiangular sectoral region. Concretely speaking, the pits 12 will naturally be formed in this manner when the recording surface of the disc 11 is divided into an odd number of equiangular sectoral regions and the pits 12 are formed in every other equiangular sectoral regions in each guide track turn. For example, when the recording surface of the disc 11 is divided into 525 equiangular sectoral regions, one of two consecutive guide track turns comprises 262 pits 12 while the other of the two consecutive guide track turns comprises 263 pits 12.

A center hole 14 is formed at a center of the disc 11, and a label portion 15 is formed on the periphery of the center hole 14. As will be described later on in the present specification, an information signal including the video signal is recorded on and reproduced from an information signal recording track formed in a region between two consecutive guide track turns of the guide track T, by use of a main light beam. In FIG. 1, a center line of the information signal recording track is indicated by a two-dot chain line 16.

Figure 2:
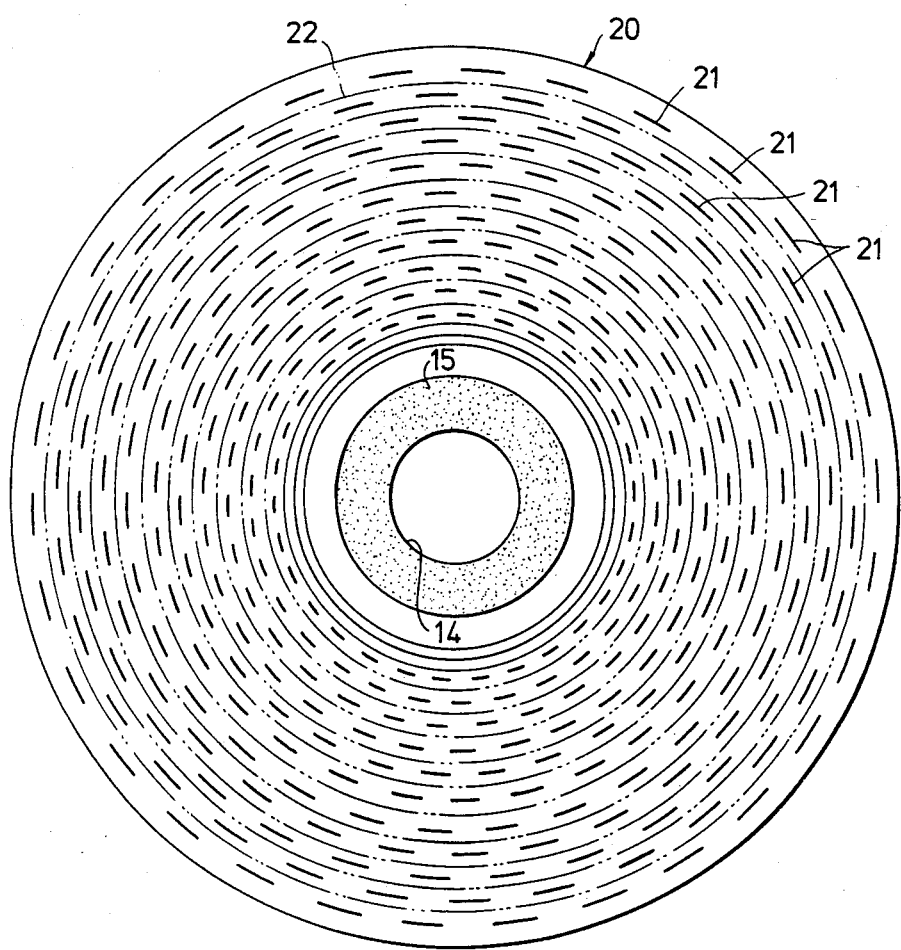
FIG. 2 shows a track pattern formed on a second embodiment of the disc according to the present invention.

FIG. 2 shows a track pattern formed on a second embodiment of the disc according to the present invention. In FIG. 2, those parts which are the same as those corresponding parts in FIG. 1 are designated by the same reference numerals, and description thereof will be omitted. In FIG. 2, a plurality of concentric guide tracks are formed on a disc 20. In the present specification, these concentric guide tracks will also be referred to as a plurality of consecutive guide track turns making up the guide track. Pits 21 are intermittently formed on each of the concentric guide tracks. When a recording surface of the disc 20 is divided into a plurality of equiangular sectoral regions, the pit 21 is formed in only one of two mutually adjacent concentric guide tracks in each equiangular sectoral region so that the pits 21 are formed in every other concentric guide tracks in a radial direction of the disc 20 in each equiangular sectoral region. Concretely speaking, the pits 21 will naturally be formed in this manner when the recording surface of the disc 20 is divided into an even number of equiangular sectoral regions and the pits 21 are formed in every other equiangular sectoral regions in each concentric guide track, that is, in each guide track turn.

The information signal is recorded on and reproduced from an information signal recording track formed in a region between two mutually adjacent concentric guide tracks, by use of the main light beam. In FIG. 2, a center line of the information signal recording track is indicated by a two-dot chain line 22. According to the disc 20, a plurality of concentric information signal recording tracks are formed because the guide track is made up of the plurality of concentric tracks. In the present specification, these concentric information signal recording tracks will also be referred to as a plurality of consecutive information recording track turns making up the information signal recording track.

Figure 3:
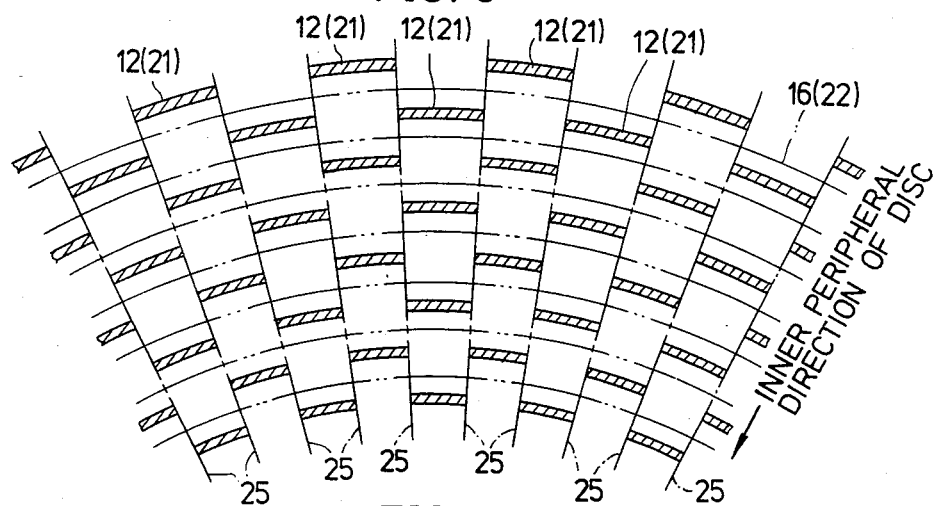
FIG. 3 is a plan view on an enlarged scale showing an essential part of the disc according to the present invention.

The discs 11 and 20 only differ in that the guide track of the disc 11 is made up of a spiral guide track and the guide track of the disc 20 is made up of a plurality of concentric guide tracks, and the configuration and recording arrangement of the pits 12 and 21 are the same. In other words, as shown on an enlarged scale in FIG. 3 which shows a part of the track pattern of the disc 11 (20), the start and end of each pit 12 (21) indicated by hatchings in one equiangular sectoral region respectively coincide with the end of the pit 12 (21) in one adjacent equiangular sectoral region and the start of the pit 12 (21) in another adjacent equiangular sectoral region. Boundary lines 25 indicated by one-dot chain lines connect the starts and ends of the pits 12 (21) in the radial direction of the disc 11 (20), and these boundary lines 25 define the equiangular sectoral regions.

Figure 4:
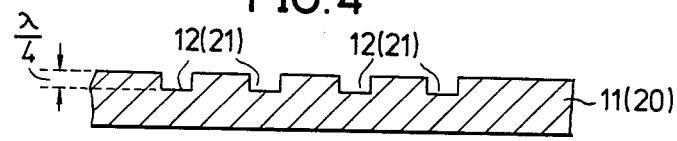
FIG. 4 is a cross sectional view showing an essential part of the disc according to the present invention.

FIG. 4 shows the cross sectional configuration of the disc 11 (20). As shown in FIG. 4, a depth of the pit 12 (21) is selected to ¼ the wavelength λ of the main and sub light beams. Hence, a phase error λ/2 is introduced between the light reflected within the groove of the pit 12 (21) and the light reflected at a position other than the groove, and the light intensity is greatly attenuated in the case of the light reflected at the groove.

Figure 5:
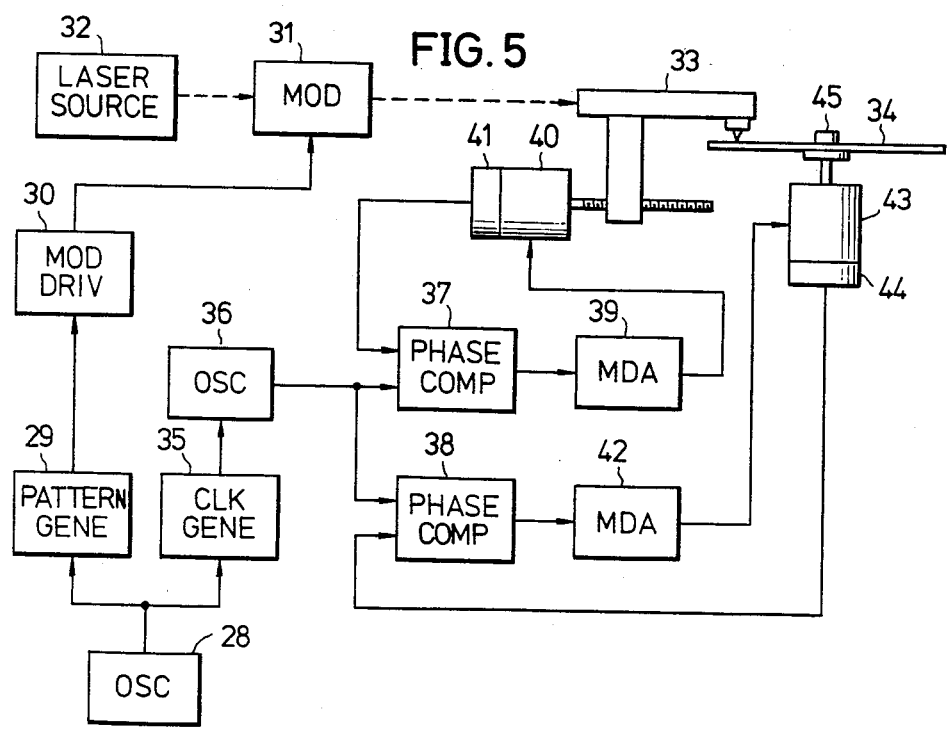
FIG. 5 is a system block diagram showing a recording system for an original disc of the disc according to the present invention.

Next, description will be given with respect to a method of producing the disc according to the present invention. In a recording system shown in FIG. 5, a signal which has a constant frequency and an extremely high frequency stability is obtained from a crystal oscillator 28 and is supplied to a pattern generator 29. The pattern generator 29 subjects the signal from the crystal oscillator 28 to a frequency division and the like so as to convert the signal into a symmetrical square wave signal having a period of two horizontal scanning periods (2H). The square wave signal is supplied to a light modulator 31 via a modulator driver 30 and modulates the light intensity of a laser beam generated from a laser generating source 32. A modulated laser beam from the light modulator 31 is focused on an original disc 34 via a pickup device 33.

On the other hand, the output signal of the crystal oscillator 28 is converted into a clock pulse signal having a predetermined period in a clock generator 35, and the clock pulse signal is applied to a clocked oscillator 36. A signal obtained from the clocked oscillator 36 in synchronism with the clock pulse signal is supplied to phase comparators 37 and 38 as a reference signal. An output signal of the phase comparator 37 is passed through a motor driving amplifier (MDA) 39 and is supplied to a motor 40 so as to control the rotation thereof. The rotational speed of the motor 40 is constantly detected by a rotation detector 41, and an output rotation detection signal of the rotation detector 41 is supplied to the phase comparator 37 as a comparison signal.

The pickup device 33 is designed to move in a radial direction of the original disc 34 at a speed dependent on the rotational speed of the motor 40 and in a direction dependent on the rotating direction of the motor 40. Accordingly, the motor 40 is rotated at a constant speed in synchronism with the output signal of the locked oscillator 36 by the operation of a closed loop constituted by the phase comparator 37, MDA 39, motor 40 and rotation detector 41. As a result, the pickup device 33 is moved at a constant speed in the radial direction of the original disc 34, that is, in an outer peripheral direction of the original disc 34, for example.

Similarly, a disc motor 43 is rotated at a constant speed in synchronism with the output signal of the locked oscillator 36 by the operation of a closed loop constituted by the phase comparator 38, MDA 42, disc motor 43 and a rotation detector 44. The disc motor 43 rotates the original disc 34 which is clamped by a clamper 45. Hence, the original disc 34 is rotated at a constant speed in synchronism with the output signal of the locked oscillator 36.

A photosensitive agent is coated on the surface of the original disc 34. The pickup device 33 irradiates the modulated laser beam on the original disc 34, and the original disc 34 is formed with a spiral track mark constituted by an alternate repetition of an irradiated portion having a time period 1 H and a non-irradiated portion having a time period of 1 H, where the irradiated portion is a portion irradiated by the modulated laser beam and the non-irradiated portion is not irradiated by the modulated laser beams.

The original disc 34 which is formed with the spiral track mark is subjected to a known developing process, and a stamper disc (not shown) is formed from the original disc 34. A known disc producing process is performed by use of this stamper disc, so as to mass produce the discs 11 each comprising the spiral track T constituted by the row of intermittent pits 12.

Figure 6:
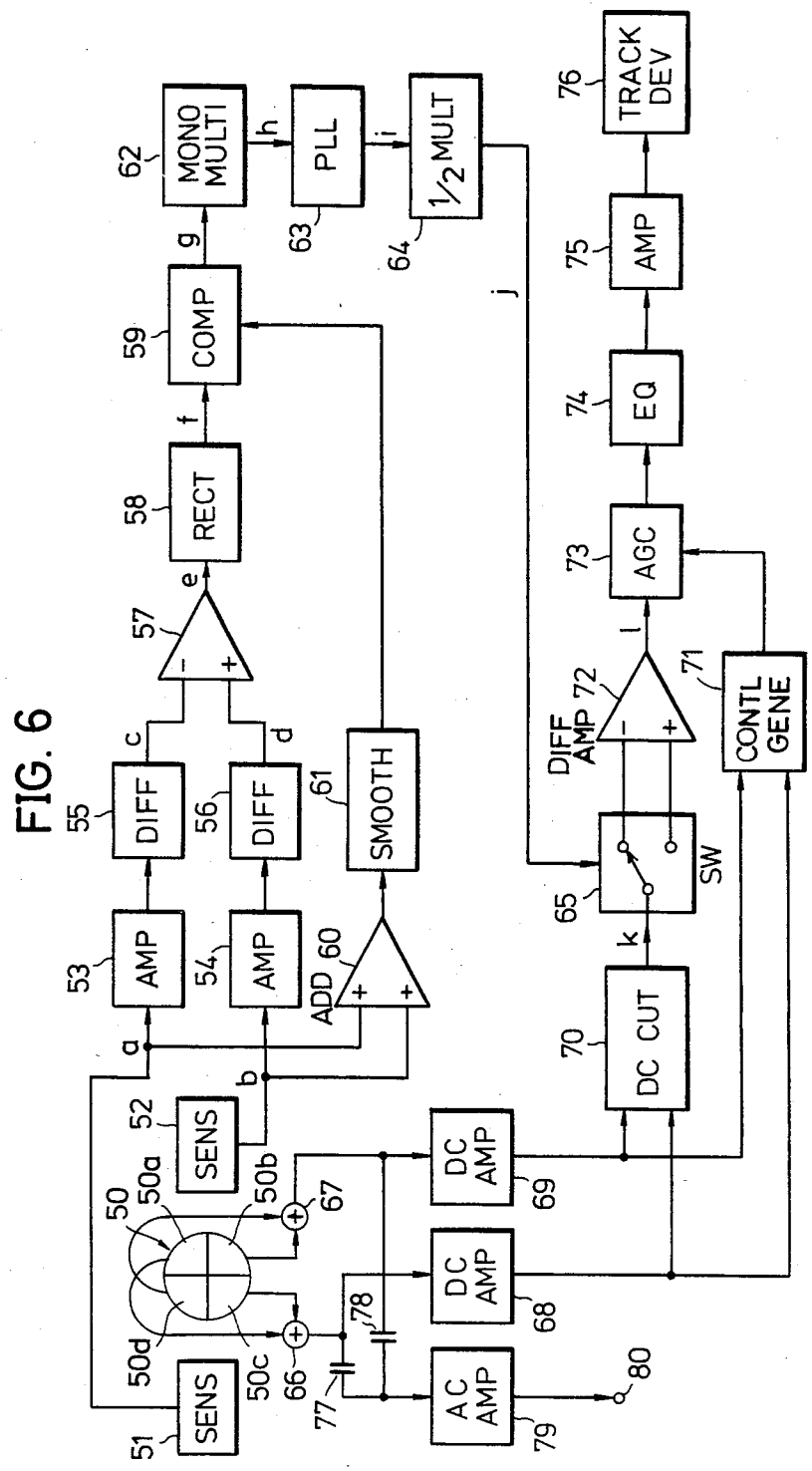
FIG. 6 is a system block diagram showing an embodiment of an essential part of the recording and reproducing apparatus according to the present invention.
Figure 7:
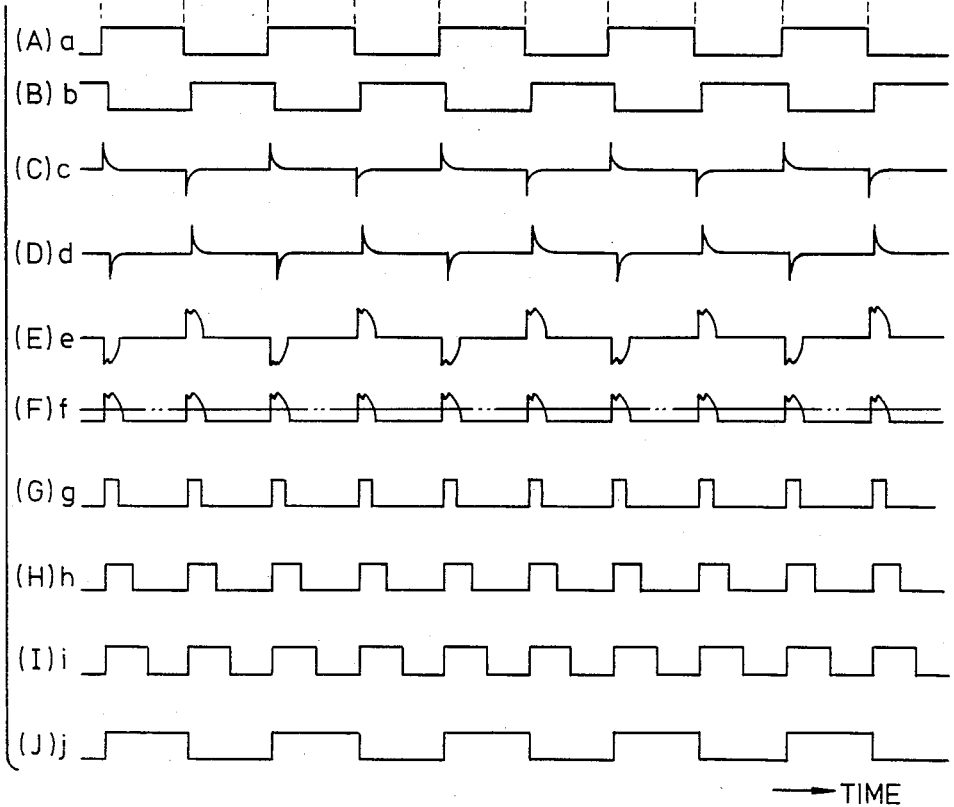
FIG. 7A shows an example of the positional relationship of light beams and tracks formed on the disc according to the present invention.
FIGS. 7B(A) through 7B(J) show signal waveforms for explaining the operation of an essential part of the block system shown in FIG. 6.

Next, description will be given with respect to an essential part of a recording and reproducing apparatus which records and reproduces the information signal on and from the disc 11 or 20, by referring to FIGS. 6 through 9. FIG. 6 shows an embodiment of an essential part of the recording and reproducing apparatus according to the present invention. In FIG. 6, a four-element photodetector 50 comprises four optical sensors 50a, 50b, 50c and 50d having identical light receiving areas. The four-element photodetector 50 is arranged at a position so as to receive the main light beam from the pickup device (not shown) which has been irradiated on the disc (not shown) and has been reflected thereby. The optical sensors 51 and 52 are arranged at positions so as to independently receive reflected lights of sub light beams $SB_1$ and $SB_2$ for tracking. As shown in FIG. 7A, the sub light beams $SB_1$ and $SB_2$ are irradiated on the disc at positions which respectively lead and trail a position irradiated by a main light beam MB in the scanning direction and are mutually deviated in the width direction of the information signal recording track. In other words, the sub light beams $SB_1$ and $SB_2$ are respectively irradiated on the two mutually adjacent guide track turns. The four-element detector 50 is used because it becomes possible to prevent diffraction in the reflected light from the guide track in the present invention, and a focal error signal is obtained based on the reflected light of the main light beam MB from the disc.

In FIG. 7A, the guide track comprises pits $P_{11}$ through $P_{35}$ and the like which are intermittently formed with a predetermined period. For example, the pits $P_{11}$, $P_{12}$, ..., and $P_{15}$ correspond to the pits formed in a portion of a first guide track turn, and the pits $P_{21}$, $P_{22}$, $P_{23}$ and $P_{24}$ correspond to the pits formed in a portion of a second guide track turn. Furthermore, the pits $P_{31}$, $P_{32}$, ..., and $P_{35}$ correspond to the pits formed in a portion of a third guide track turn. As described before, the pits are pre-formed on the disc before the disc is recorded with the information signal. In FIG. 7A, I-1 and I-2 respectively denote center lines of the information recording track turns.

FIG. 7B(A) shows a signal a reproduced from the second guide track turn by detecting the light intensity of the reflected light of the sub light beam $SB_1$ by the optical sensor 51. FIG. 7B(B) shows signal b reproduced from the first guide track turn by detecting the light intensity of the reflected light of the sub light beam $SB_2$ by the optical sensor 52. A phase error $\lambda/2$ is introduced between the light reflected within the groove of the pit and the light reflected outside the groove of the pit when the sub light beams $SB_1$ and $SB_2$ scan the respective pits as shown in FIG. 7A, where $\lambda$ is the wavelength of the main and sub light beams, and the reflected lights of each sub light beam cancel each other. As a result, the light intensity of the reflected light of each sub light beam is greatly attenuated during the time period in which the sub light beam scans the pit, and the reproduced signal from the guide track turn has a low level during this time period as shown in FIGS. 7B(A) and 7B(B). On the other hand, there is virtually no attenuation of the light intensities of the reflected lights of the sub light beams $SB_1$ and $SB_2$ when the sub light beams $SB_1$ and $SB_2$ scan the non-pit portion on the disc. For this reason, the light intensity of the reflected light of each sub light beam is high during the time period in which the sub light beam scans the non-pit portion, and the reproduced signal from the guide track turn has a high level during this time period as shown in FIGS. 7B(A) and 7B(B). In actual practice, the main and sub light beams MB, $SB_1$ and $SB_2$ are extremely close to each other, but FIG. 7A shows the relationship of the pits $P_{11}$ through $P_{35}$ and the main and sub light beams MB, $SB_1$ and $SB_2$ in an exaggerated manner for convenience' sake.

The reproduced signals a and b shown in FIGS. 7B(A) and 7B(B) are square wave signals having a period dependent on the period of the pits. However, in actual practice, the waveforms of the reproduced signals a and b do not become perfect square waves due to slight deviations in the beam spots. However, even when the waveforms of the reproduced signals a and b are not perfect square waves, it is still possible to obtain information related to the ends (start and end) of the pits $P_{11}$ through $P_{35}$ (hereinafter simply referred to as end information) from the edges of the reproduced signals a and b. There is a relative phase error between the reproduced signals a and b since the sub light beams $SB_1$ and $SB_2$ are irradiated on the disc at positions which respectively lead and trail the position irradiated by the main light beam MB in the scanning direction, but this phase error is not directly related to the subject matter of the present invention.

The reproduced signals a and b are passed through respective amplifiers 53 and 54, and are supplied to respective differentiating circuits 55 and 56 wherein the end information of the pits are obtained by differentiating the signals. Differentiated pulse signals c and d shown in FIGS. 7B(C) and 7B(D) are produced from the respective differentiating circuits 55 and 56 and are supplied to a differential amplifier 57. The differential amplifier 57 converts the differentiated pulse signals c and d into a pulse signal e shown in FIG. 7B(E). The pulse signal e is formed into a pulse signal f shown in FIG. 7B(F) in a full-wave rectifying circuit 58, and the pulse signal f is supplied to a comparator 59. The reproduced signals a and b are added in an adder 60, and an output signal of the adder 60 is smoothened in a smoothing circuit 61 so as to obtain a signal having a level corresponding to an average value of the quantity of reflected light. The comparator 59 compares the pulse signal f and the output signal of the smoothing circuit 61 having a level which is indicated by a two-dot chain line in FIG. 7B(F) and indicates the average value of the quantity of the reflected light. As a result, a pulse signal g shown in FIG. 7B(G) is produced from the comparator 59.

The pulse signal g is a clock pulse signal having a period equal to the period of the pits. The pulse signal g is formed into a pulse signal h shown in FIG. 7B(H) in a monostable multivibrator 62, and the pulse signal h is formed into a pulse signal i shown in FIG. 7B(I) in a phase locked loop (PLL) circuit 63. The pulse signal i is multiplied by $\frac{1}{2}$ in a $\frac{1}{2}$ multiplying circuit 64, and a pulse signal j shown in FIG. 7B(J) is produced from the multiplying circuit 64. The PLL circuit 63 produces the pulse signal i with a constant phase even when there is a dropout in the clock pulse signal g or the like, so as to compensate for the dropout or the like. The pulse signal j is a square wave signal having a high level when one of the sub light beams scans the pit of the guide track turn on one side of the information recording track turn, and having a low level when the other of the sub light beams scans the pit of the guide track turn on the other side of the information recording track turn. Hence, the pulse signal j has a period dependent on the recording period of the pits, and is supplied to a switching circuit 65 as a switching pulse signal.

On the other hand, out of the four optical sensors 50a through 50d constituting the four-element photodetector 50, output signals of a first pair of diagonally arranged optical sensors 50a and 50c are added in an adder 66, and output signals of a second pair of diagonally arranged optical sensors 50b and 50d are added in an adder 67.

Output signals of the adders 66 and 67 are passed through respective D.C. amplifiers 68 and 69 and are supplied to a D.C. cutting circuit 70 wherein the signals are mixed and eliminated of the D.C. component. Output signals of the D.C. amplifiers 68 and 69 are also supplied to a control signal generating circuit 71 for generating a control signal for an automatic gain control (AGC) circuit 73 which will be described later. When the main light beam MB correctly scans the position between two mutually adjacent guide track turns, the main light beam MB scans a portion of the pits and the quantity of the reflected light is slightly decreased thereby. However, as described before in conjunction with FIG. 3, the ends of the pits lie on the boundary lines 25, and thus, the slight decrease in the quantity of reflected light is constant even when moving from the pit in one of two mutually adjacent guide track turns to the pit in the other of the two mutually adjacent guide track turns. In other words, even though the pits are formed intermittently, the quantity of the reflected light of the main light beam MB is completely unaffected thereby because the decrease is constant.

When it is assumed for convenience' sake that the beam spot formed by the main beam MB successively moves over positions $(A_1)$ through $(A_{10})$ shown in FIG. 9A, the waveform of an output signal k of the D.C. cutting circuit 70 becomes as shown in FIG. 9B(A). In FIG. 9A, $P_{11}$ through $P_{15}$ denote the pits formed in the first guide track turn, $P_{21}$ through $P_{25}$ denote the pits formed in the second guide track turn and I-1 denotes the center line of the information recording track turn. When the beam spot of the main light beam MB is at the positions $(A_1)$ through $(A_5)$, the main beam spot is deviated upwardly toward the first guide track turn. Hence, the signal k has a low level as shown in FIG. 9B(B) when the main beam spot is at the positions $(A_1)$, $(A_3)$ and $(A_5)$ because the main beam spot is formed on a portion of the pits $P_{11}$, $P_{12}$ and $P_{13}$ at these positions and the quantity of the reflected light is small. On the other hand, the signal k has a high level as shown in FIG. 9B(B) when the main beam spot is at the positions $(A_2)$ and $(A_4)$ because the main beam spot is not formed on a portion of the pits $P_{21}$ and $P_{22}$. In addition, the main beam spot is deviated downwardly toward the second guide track turn at the positions $(A_6)$ through $(A_9)$, and the waveform of the signal k changes as shown in FIG. 9B(B) depending on the existence or non-existence of the pits $P_{23}$ and $P_{24}$ in the second guide track turn. The main beam spot is at an optimum position at the position $(A_{10})$ where the main beam spot is slightly formed on a portion of the pit $P_{25}$ and the signal k has an intermediate level between the high and low levels as shown in FIG. 9B(B).

The switching circuit 65 selectively supplies the signal k to a non-inverting input terminal of a differential amplifier 72 during a high level period of the switching pulse signal j shown in FIG. 9B(A), and selectively supplies the signal k to an inverting input terminal of the differential amplifier 72 during a low-level period of the pulse signal j. Accordingly, the signal k supplied to the non-inverting input terminal of the differential amplifier 72 is obtained with the same phase but the signal k supplied to the inverting input terminal of the differential amplifier 72 is obtained with an inverted phase, and a signal l shown in FIG. 9B(C) is produced from the differential amplifier 72. The signal l is supplied to the AGC circuit 73. The signal l is a tracking error signal which indicates that the main beam spot is deviated upwardly toward the first guide track turn when the signal l has a level lower than a center level indicated by a two-dot chain line in FIG. 9B(C), that the main beam spot is deviated downwardly toward the second guide track turn when the signal l has a level higher than the center level, and that there is not tracking error when the signal l has a level equal to the center level between the high and low levels.

The level of the tracking error signal l is controlled in the AGC circuit 73 based on the output control signal of the control signal generating circuit 71. The AGC circuit 73 and the control signal generating circuit 71 are provided so as to compensate for the variation in the quantity of reflected light. For example, the effects caused by a difference in the quantities of the main light beam at the time of the recording and at the time of the reproduction and the variation in the quantity of reflected light due to dirt or the like on the surface of the disc are eliminated by these circuits.

Figure 8:
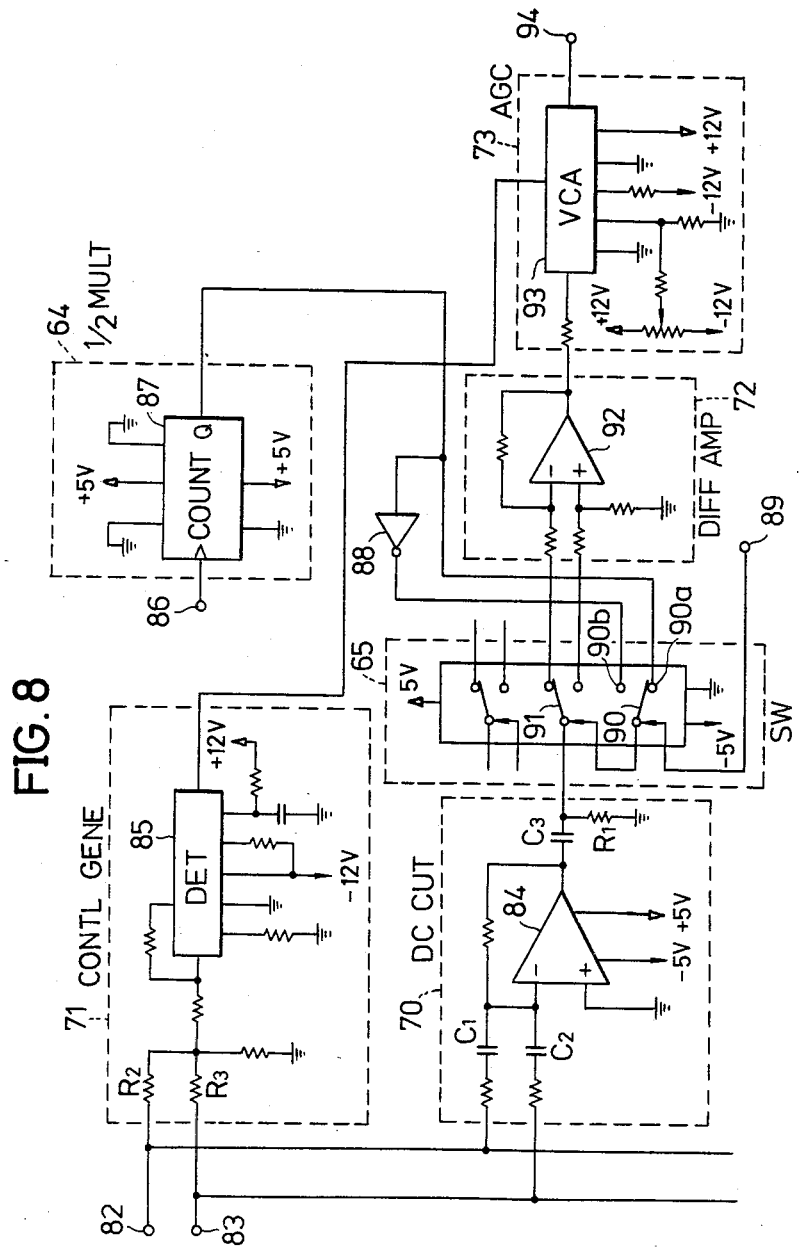
FIG. 8 is a circuit diagram showing an embodiment of an essential part of the block system shown in FIG. 6.

FIG. 8 shows an embodiment of an essential part of the block system shown in FIG. 6. In FIG. 8, those parts which are the same as those corresponding parts in FIG. 6 are designated by the same reference numerals. The signals reproduced by the main light beam MB and obtained from the D.C. amplifiers 68 and 69 are applied to respective input terminals 82 and 83. The D.C. components of the low frequency components of the reproduced signals from the input terminals 82 and 83 are eliminated in capacitors C1 and C2 of the D.C. cutting circuit 70. Then, the reproduced signals are mixed and a mixed signal is amplified in an operational amplifier 84 of the D.C. cutting circuit 70. An output signal of the operational amplifier 84 is passed through a differentiating circuit comprising a capacitor C3 and a resistor R1 within the D.C. cutting circuit 70, and is supplied to a common terminal 91 of the switching circuit 65.

The low frequency components of the reproduced signals from the input terminals 82 and 83 are mixed via resistors R2 and R3 of the control signal generating circuit 71, and a mixed signal is then converted into a control voltage having a level dependent on the quantity of reflected main light beam MB from the disc in a detecting circuit 85 of the control signal generating circuit 71.

The ½ multiplying circuit 64 generally comprises a counter 87 for counting pulses of the pulse signal which is produced from the PLL circuit 63 and is obtained via an input terminal 86. An output signal of the counter 87 is supplied to a switching terminal 90a of a switch 90 within the switching circuit 65. The output signal of the counter 87 is also passed through an inverter 88 and is supplied to a switching terminal 90b of the switch 90.

The switch 90 within the switching circuit 65 is switched responsive to a switching pulse signal obtained via a terminal 89. The switching pulse signal is obtained by frequency dividing by ½ a control pulse signal (jumping pulse signal) which is used to forcibly shift the pickup in the radial direction of the disc by one track pitch. The phase of the pits with respect to the main light beam MB is inverted in the two mutually adjacent guide track turns, as may be seen from FIG. 7A. For this reason, the switch 90 is switched so as to constantly obtain a correct tracking polarity. The signal passed through the switch 90 is applied to a switch 91 as a switching pulse signal.

The differential amplifier 72 generally comprises an operational amplifier 92, and a signal from the switch 91 is supplied to one of non-inverting and inverting input terminals of the operational amplifier 72. The AGC circuit 73 comprises a voltage controlled amplifier (VCA) 93 and the like, and a gain of the VCA 93 is variably controlled by the output voltage of the detecting circuit 85. An output tracking error signal of the AGC circuit 73 is passed through an output terminal 94, an equalizer circuit 74 and an amplifier 75 shown in FIG. 6, and is supplied to a tracking device 76.

Hence, the optical paths of the main and sub light beams MB, SB$_1$ and SB$_2$ are minutely displaced in the track width direction so that the main light beam MB scans the center position between the center lines of the two mutually adjacent guide track turns, while the positional relationship of the main and sub light beams MB, SB$_1$ and SB$_2$ is maintained the same. Therefore, the tracking control is performed so that the main light beam MB constantly scans at the position (A$_{10}$) shown in FIG. 9A to record the information signal by forming the information signal recording track or to reproduce the pre-recorded information signal from the information signal recording track.

Accordingly, the tracking control is not only performed at the time of the reproduction when the pre-recorded information signal is reproduced from the information recording track turn which is formed between two mutually adjacent guide track turns, but is also performed at the time of the recording when the information signal is newly recorded by forming the information recording track turn between two mutually adjacent track turns by the main light beam MB.

At the time of the reproduction, the recorded information from the guide track turns and the recorded information signal from the information recording track turn are simultaneously reproduced by the main light beam MB. However, the reproduced information signal (RF signal) from the information recording track turn has a frequency band in the MHz order, while the reproduced information from the guide track turns has a frequency band in the kHz order, that is, a few kHz. Thus, only the reproduced information from the guide track turns is frequency-selected and is outputted via an output terminal 80 shown in FIG. 6.

In other words, the reproduced signals from the adders 66 and 67 are passed through D.C. blocking capacitors 77 and 78 and are mixed before being supplied to an A.C. amplifier 79. The A.C. amplifier 79 amplifies only a high frequency component in the MHz order of the signal supplied thereto, and an output signal of the A.C. amplifier 79 is supplied to a known information signal processing circuit (not shown) via the output terminal 80.

The information signal comprises a video signal, an audio signal and the like. For example, the information signal is recorded and reproduced in the form of a frequency division multiplexed signal which has been frequency modulated, where the frequency division multiplexed signal comprises a frequency modulated luminance signal and a frequency converted carrier chrominance signal which has been frequency converted into a low frequency band.

The guide track turns are used only for the tracking control. For this reason, the information signal may be recorded on and reproduced from the discs 11 and 20 in conformance with not only the CAV system but also a constant linear velocity (CLV) system.

Further, the present invention is not limited to these embodiments, but various variations and modifications may be made without departing from the scope of the present invention.

What is claimed is:

1. A rotary recording medium comprising:
   a recording surface which is divided into a plurality of imaginary equiangular sectoral regions each of which is defined by two of a plurality of imaginary radial lines; and
   a guide track formed on said recording surface, said guide track comprising a spiral track or concentric tracks, each track turn of said guide track being constituted by a row of pits formed in every other of said equiangular sectoral regions, said pit being only formed in one of two mutually adjacent track turns of the guide track in each of said equiangular sectoral regions so that the pits are formed in every other track turns of the guide track in a radial direction of the rotary recording medium in each of said equiangular sectoral regions, each pit having two ends which respectively lie on two imaginary radial lines defining said each pit,
   an intermediate part between center lines of said two mutually adjacent track turns of the guide track being used for forming a recording track for an information signal at a time of a recording.

2. A rotary recording medium as claimed in claim 1 in which said pits of said guide track have a depth which is ¼ the wavelength of a light beam which is used for recording and reproduction of said information signal.

3. A rotary recording medium as claimed in claim 1 in which said pits of said guide track have a length corresponding to one horizontal scanning period of a video signal of said information signal.

4. A rotary recording medium as claimed in claim 1 in which an odd number of said equiangular sectoral regions exist in one track turn of the guide track, said guide track comprising a spiral guide track made up of consecutive guide track turns.

5. A rotary recording medium as claimed in claim 1 in which an even number of said equiangular sectoral regions exist in one track turn of the guide track, said guide track comprising a plurality of concentric guide tracks.

6. A recording and reproducing apparatus for recording and reproducing a signal on and from a rotary recording medium, said rotary recording medium comprising a recording surface which is divided into a plurality of imaginary equiangular sectoral regions and a guide track formed on said recording surface, said guide track comprising a spiral track or concentric tracks, each track turn of said guide track being constituted by a row of pits formed in every other of said equiangular sectoral regions, said pit being only formed in one of two mutually adjacent track turns of the guide track in each of said equiangular sectoral regions so that the pits are formed in every other track turns of the guide track in a radial direction of the rotary recording medium in each of said equiangular sectoral regions, said recording and reproducing apparatus comprising:

means for generating a main light beam and sub light beams;

switching pulse producing means for producing a switching pulse signal having a period dependent on a period of said pits of said guide track based on signals which are reproduced from said two mutually adjacent track turns of the guide track by said sub light beams;

polarity inverting means for alternately inverting a polarity of signals which are reproduced from said two mutually adjacent track turns by said main light beam which scans an intermediate part between center lines of said two mutually adjacent track turns for every one half period of said switching pulse signal responsive to said switching pulse signal and for generating a tracking error signal;

tracking means for variably controlling scanning positions of said main and sub light beams in a width direction of the guide track depending on said tracking error signal; and recording and reproducing means for forming an information recording track for the information signal in said intermediate part by said main light beam at a time of a recording and for reproducing the recorded information signal from the information recording track at the time of a reproduction.

7. A recording and reproducing apparatus as claimed in claim 6 in which said sub light beams comprise first and second sub light beams for scanning positions which respectively lead and trail a position on said rotary recording medium irradiated by said main light beam in a scanning direction and are mutually deviated in a width direction of the information recording track, said recording and reproducing means comprising optical sensors for independently receiving reflected lights from said rotary recording medium.

8. A recording and reproducing apparatus as claimed in claim 6 which further comprises a control signal generating circuit supplied with signals reproduced from said rotary recording medium by said main light beam for generating a control signal having a level dependent on a quantity of reflected light of said main light beam from said rotary recording medium, and an automatic gain control circuit for controlling the level of said tracking error signal from said polarity inverting means responsive to said control signal and for supplying the level controlled tracking error signal to said tracking means.

* * * * *